(12) United States Patent
Amakasu et al.

(10) Patent No.: US 11,990,136 B2
(45) Date of Patent: May 21, 2024

(54) SPEECH RECOGNITION DEVICE, SEARCH DEVICE, SPEECH RECOGNITION METHOD, SEARCH METHOD, AND PROGRAM

(71) Applicant: NIPPON TELEGRAPH AND TELEPHONE CORPORATION, Tokyo (JP)

(72) Inventors: Tetsuo Amakasu, Tokyo (JP); Kaname Kasahara, Tokyo (JP); Takafumi Hikichi, Tokyo (JP); Masayuki Sugizaki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 353 days.

(21) Appl. No.: 17/428,276

(22) PCT Filed: Jan. 24, 2020

(86) PCT No.: PCT/JP2020/002558
§ 371 (c)(1),
(2) Date: Aug. 4, 2021

(87) PCT Pub. No.: WO2020/162229
PCT Pub. Date: Aug. 13, 2020

(65) Prior Publication Data
US 2022/0108699 A1    Apr. 7, 2022

(30) Foreign Application Priority Data

Feb. 6, 2019    (JP) ................................ 2019-019476

(51) Int. Cl.
*G10L 15/00* (2013.01)
*G06F 16/245* (2019.01)
(Continued)

(52) U.S. Cl.
CPC ............ *G10L 15/32* (2013.01); *G06F 16/245* (2019.01); *G06N 3/04* (2013.01); *G10L 15/02* (2013.01);
(Continued)

(58) Field of Classification Search
CPC ..... G10L 15/08; G10L 15/1822; G10L 15/20; G10L 15/32
See application file for complete search history.

(56) References Cited

U.S. PATENT DOCUMENTS 6,421,645 B1 * 7/2002 Beigi ....................... G10L 17/00
704/E15.045
9,495,350 B2 * 11/2016 John ....................... G06F 40/20
(Continued)

FOREIGN PATENT DOCUMENTS

| EP | 3739573 B1 * | 6/2023 | ......... G06K 9/00228 |
| JP | 5549506 B2 * | 7/2014 | |
| JP | 2016062333 A | 4/2016 | |

OTHER PUBLICATIONS

Fukutomi et al. (2010) "Extraction of a Customer's Request Phase from Contact-Center Dialogue by Using a Pair of Request and Response Expressions" Proceedings of the Japanese Society of Acoustics, 223-226.
(Continued)

*Primary Examiner* — Daniel Abebe (57) ABSTRACT

It is intended to acquire a highly accurate speech recognition result for a subject of a conversation, while inhibiting an increase in the amount of calculation. A speech recognition device (10) according to the present invention includes a first speech recognition unit (11) that performs speech recognition processing using a first method on speech data of a conversation made by a plurality of speakers and outputs a speech recognition result for each of respective uttered speech segments of the plurality of speakers, a
(Continued)

determination unit (13) that determines a subject segment based on a result of the speech recognition processing by the first speech recognition unit 11, and a second speech recognition unit (14) that performs speech recognition processing using a second method higher in accuracy than the first method on the speech data in the segment determined to be the subject segment and outputs a speech recognition result as a subject text.

9 Claims, 9 Drawing Sheets

(51) Int. Cl.
| | |
|---|---|
| *G06N 3/04* | (2023.01) |
| *G10L 15/02* | (2006.01) |
| *G10L 15/04* | (2013.01) |
| *G10L 15/14* | (2006.01) |
| *G10L 15/16* | (2006.01) |
| *G10L 15/22* | (2006.01) |
| *G10L 15/32* | (2013.01) |
| *G10L 15/08* | (2006.01) |

(52) U.S. Cl.
CPC ............ *G10L 15/04* (2013.01); *G10L 15/142* (2013.01); *G10L 15/16* (2013.01); *G10L 15/22* (2013.01); *G10L 2015/088* (2013.01)

(56) References Cited

U.S. PATENT DOCUMENTS

| | | | | |
|---|---|---|---|---|
| 10,020,007 | B2* | 7/2018 | Mizumoto | G10L 25/51 |
| 10,558,421 | B2* | 2/2020 | Abuelsaad | H04M 3/569 |
| 10,878,011 | B2* | 12/2020 | Ashoori | G06F 16/3344 |
| 11,574,628 | B1* | 2/2023 | Kumatani | G06N 3/084 |
| 2005/0182628 | A1* | 8/2005 | Choi | G10L 15/08 |
| | | | | 704/252 |
| 2018/0308487 | A1* | 10/2018 | Goel | G10L 15/1815 |
| 2021/0050017 | A1* | 2/2021 | Kim | G10L 15/063 |

OTHER PUBLICATIONS

Hinton et al. (2012) "Deep Neural Networks for Acoustic Modeling in Speech Recognition: The Shared Views of Four Research Groups" IEEE Signal Processing Magazine, vol. 29, No. 6, pp. 82-97.

* cited by examiner

SPEECH RECOGNITION DEVICE, SEARCH DEVICE, SPEECH RECOGNITION METHOD, SEARCH METHOD, AND PROGRAM

CROSS-REFERENCE TO RELATED APPLICATIONS

This application is a U.S. 371 Application of International Patent Application No. PCT/JP2020/002558, filed on 24 Jan. 2020, which application claims priority to and the benefit of JP Application No. 2019-019476, filed on 6 Feb. 2019, the disclosures of which are hereby incorporated herein by reference in their entireties.

TECHNICAL FIELD

The present invention relates to a speech recognition device, a retrieval device, a speech recognition method, a retrieval method, and a program.

BACKGROUND ART

In such a situation where a customer response representative, responds to a customer in a contact center, a service counter, or the like, it is required to analyze a conversation made between the customer response representative and the customer, recognize details of the conversation without listening to a conversational speech or extract intended information from the details of the conversation. For such conversation analysis, speech recognition processing in which a conversational speech is transcribed into a text may be performed.

As a calculation method for an acoustic score to be used for speech recognition processing, a method such as a hidden Markov model (HMM) or HMM-DNN (Deep Neural Network) (see, e.g., NPL 1) has conventionally been used. A speech recognition method using the acoustic score calculation method such as the HMM or the HMM-DNN allows speech recognition processing to be performed with a relatively small number of processing units in an environment in which calculation processing is relatively small, and it is necessary to perform the speech recognition processing on a plurality of conversations, such as in a contact center.

CITATION LIST

Non-Patent Literature

[NPL 1] "Deep Neural Networks for Acoustic Modeling in Speech Recognition: The Shared Views of Four Research Groups", Geoffrey Hinton, Li Deng, Dong Yu, George E. Dahl, Abdel-rahman Mohamed, Navdeep Jaitly, Anderew Senior, Vincent Vanhoucke, Patrick Nguyen, Tara N. Sainath, and Brian Kingsbury, IEEE Signal Processing Magazine, Volume 29, Issue 6, pp. 82-97, November 2012.

SUMMARY OF THE INVENTION

Technical Problem

In accordance with the conventionally used speech recognition method using the acoustic score calculation method such as the HMM or the HMM-DNN, decoding processing is started at the beginning of each of speeches uttered in a conversation and, after the uttered speech is ended, a result of speech recognition can rapidly be obtained. However, a problem arises in that, with this method, sufficient speech recognition accuracy cannot be obtained. In particular, in a customer-side speech in a contact center, noise such as line noise or a noisy sound made by someone or something other than a customer is mixed to degrade the speech recognition accuracy.

By using a speech recognition method using an acoustic score calculation method more resistant to noise which presents a problem in performing speech recognition of a phone speech or the like, such as CNN-NIN (Convolutional Neural Network and Network in Network), it is expected to obtain a more highly accurate speech recognition result. However, this method requires a larger amount of calculation than that of calculation required by the conventionally used speech recognition method and therefore has a problem in that, when speech recognition processing is performed on all the speeches in a conversation, required calculation resources increase.

An object of the present invention achieved in view of problems as described above is to provide a speech recognition device, a retrieval device, a speech recognition method, a retrieval method, and a program which allow a highly accurate speech recognition result to be acquired for a subject of a conversation, while inhibiting an increase in the amount of calculation.

Means for Solving the Problem

To solve the problem described above, a speech recognition device according to the present invention includes: a first speech recognition unit that performs speech recognition processing using a first method on speech data of a conversation made by a plurality of speakers and outputs a speech recognition result for each of respective uttered speech segments of the plurality of speakers; a determination unit that determines, on the basis of a result of the speech recognition processing by the first speech recognition unit, a subject segment corresponding to the segment in which a speech including a subject of the conversation is uttered; and a second speech recognition unit that performs speech recognition processing using a second method higher in accuracy than the first method on speech data in the segment determined to be the subject segment by the determination unit and outputs a speech recognition result as a subject text.

To solve the problem described above, a retrieval device according to the present invention is a retrieval device that performs retrieval using a text input thereto as a retrieval query, the retrieval device retrieving, on the basis of the retrieval query, a retrieval index in which the subject text output from the second speech recognition unit described above is associated with an identifier of the conversation including the uttered speech and outputting the identifier associated with the subject text including the retrieval query or similar to the query.

To solve the problem described above, a speech recognition method according to the present invention is a speech recognition method to be implemented in a speech recognition device and includes the steps of: performing speech recognition processing using a first method on speech data of a conversation made by a plurality of speakers and outputting a speech recognition result for each of respective uttered speech segments of the plurality of speakers; determining, on the basis of a result of the speech recognition processing using the first method, a subject segment corresponding to the segment in which a speech including a subject of the conversation is uttered; and performing speech recognition processing using a second method higher in accuracy than the first method on the speech data in the segment determined to be the subject segment and outputting a speech recognition result as a subject text.

To solve the problem described above, a retrieval method according to the present invention is a retrieval method to be implemented in a retrieval device that performs retrieval using a text input thereto as a retrieval query, the retrieval method including the steps of: retrieving, on the basis of the retrieval query, a retrieval index in which the subject text output using the second method described above is associated with an identifier of the conversation including the uttered speech; and outputting the identifier associated with the subject text including the retrieval query or similar to the retrieval query.

To solve the problem described above, a program according to the present invention causes a computer to function as the speech recognition device described above.

To solve the problem described above, a program according to the present invention causes a computer to function as the retrieval device described above.

Effects of the Invention

The speech recognition device, the retrieval device, the speech recognition method, the retrieval method, and the program according to the present invention allow a highly accurate speech recognition result to be acquired for a subject of a conversation, while inhibiting an increase in the amount of calculation.

DESCRIPTION OF EMBODIMENTS

Referring to the drawings, a description will be given below of a mode for carrying out the present invention.

Figure 1:
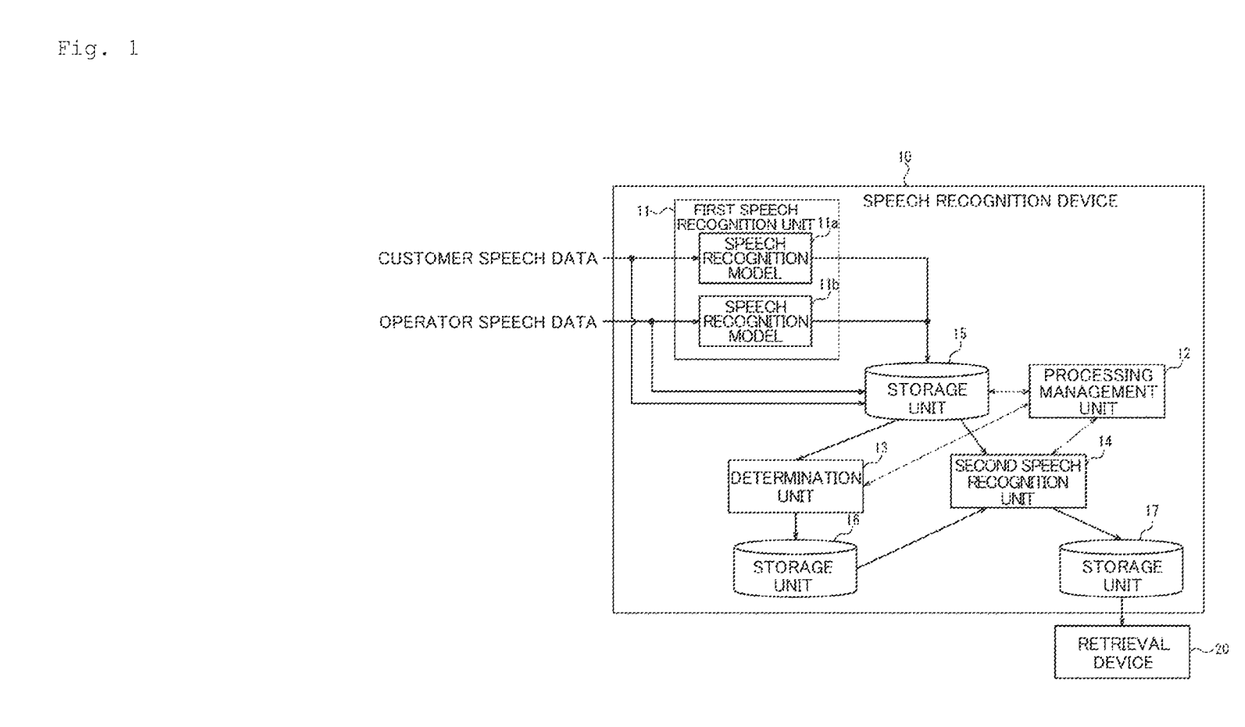
FIG. 1 is a diagram illustrating an example of a configuration of a speech recognition device according to an embodiment of the present invention.

FIG. 1 is a diagram illustrating an example of a configuration of a speech recognition device 10 according to an embodiment of the present invention. The speech recognition device 10 according to the present embodiment performs speech recognition processing on speech data of a conversation made by a plurality of speakers, such as a conversation between a customer response representative and a customer in a contact center, a service counter, or the like and outputs, as a result of the speech recognition processing, a text into which a speech uttered by each of the speakers in the conversation is transcribed. In FIG. 1, a retrieval device 20 according to the present embodiment is also illustrated. The retrieval device 20 retrieves a text coincident with or similar to a text input as a retrieval query from among the texts obtained by the speech recognition processing performed by the speech recognition device 10. By way of example, a phone conversation between the customer response representative (operator) in the contact center and the customer will be described below as the conversation made by the plurality of speakers.

A description will be given of a configuration of the speech recognition device 10.

The speech recognition device 10 illustrated in FIG. 1 includes a first speech recognition unit 11, a processing management unit 12, a determination unit 13, a second speech recognition unit 14, and storage units 15 to 17. In FIG. 1, solid-line arrows represent flows of data or information, while dotted-line arrows represent flows of notices between individual constituent features or the like.

To the speech recognition device 10, speech data of the conversation between the operator and the customer is input. More specifically, to the speech recognition device 10, speech data of a speech uttered by the operator (operator speech data) and speech data of a speech uttered by the customer (customer speech data) in the conversation between the operator and the customer are separately input. The input speech data sets (the operator speech data and the customer speech data) of the conversation are input to the first speech recognition unit 11, while being stored in association with an identifier (conversation ID) which allows the conversation to be identified in the storage unit 15.

The first speech recognition unit 11 performs speech recognition processing on each of the input operator speech data and the input customer speech data to generate recognition result texts indicating details of the uttered speeches. Specifically, the first speech recognition unit 11 detects, from the input speech data sets, segments in which speeches were uttered, performs the speech recognition processing on the speech data in the segments, and outputs the recognition result texts obtained by texting the details of the uttered speeches. The first speech recognition unit 11 sequentially proceeds with the speech recognition processing performed on the speech data sets (the customer speech data and the operator speech data) gradually obtained with the progress of the conversation and outputs the recognition result texts corresponding to a result of the speech recognition processing for each of the segments (uttered speech segments) determined on the basis of a beginning end and a terminal end of the uttered speech. The first speech recognition unit 11 causes the storage unit 15 to store the recognition result texts for the uttered speech segment in association with the conversation ID of the conversation including the uttered speech segment.

The first speech recognition unit 11 includes a speech recognition model 11a and a speech recognition model 11b. The first speech recognition unit 11 uses the speech recognition model 11a to perform the speech recognition processing on the customer speech data to generate a customer text serving as the recognition result text indicating details of the speech uttered by the customer. The first speech recognition unit 11 also uses the speech recognition model 11b to perform the speech recognition processing on the operator speech data to generate an operator text serving as the recognition result text indicating details of the speech uttered by the operator.

As each of the speech recognition models 11a and 11b, it is preferable to use an acoustic model which satisfies such a standard that it is possible to simultaneously perform the speech recognition processing on all the speeches in a traffic of calls made to the contact center with an operationally rational amount of calculation equipment, while allowing the speech recognition results to retain a given degree of correctness. As an example of such an acoustic model, a speech recognition model using a HMM-DNN method can be used for calculation of an acoustic score, but the speech recognition model to be used for the calculation of the acoustic score is not limited thereto. For example, a speech recognition model using a HMM method may also be used instead.

Thus, the first speech recognition unit 11 performs the speech recognition processing on the speech data sets of the conversation made by the plurality of speakers in accordance with a speech recognition method (first method) using the HMM method, the HMM-DNN method, or the like and outputs the speech recognition result (recognition result text) for each of the uttered speech segments of the plurality of speakers.

Note that, in FIG. 1, an example is illustrated in which the first speech recognition unit 11 uses the speech recognition models 11a and 11b to perform the speech recognition processing for each of the speakers and outputs the customer text and the operator text, but the present invention is not limited thereto. The first speech recognition unit 11 may also use one speech recognition model that allows the speakers to be identified to perform the speech recognition processing and output the customer text and the operator text.

The processing management unit 12 manages processing performed by the determination unit 13 and the second speech recognition unit 14. Specifically, the processing management unit 12 causes the storage unit 15 to store, for each of the conversations identified by the conversation ID, whether or not determination of a subject segment made by the determination unit 13 and speech recognition processing performed by the second speech recognition unit 14, each described later, are completed. Then, in response to an inquiry from the determination unit 13, the processing management unit 12 reports the conversation ID of the conversation, for which the determination of the subject segment has not been completed yet, to the determination unit 13 from which the inquiry was received. Meanwhile, in response to an inquiry from the second speech recognition unit 14, the processing management unit 12 reports the conversation ID of the conversation, for which the speech recognition processing by the second speech recognition unit 14 has not been completed yet, to the second speech recognition unit 14 from which the inquiry was received. Details of an operation of the processing management unit 12 will be described later.

The determination unit 13 acquires the recognition result texts scored in association with the conversation ID reported from the processing management unit 12 in the storage unit 15 or acquires the recognition result texts and the speech data sets and determines the subject segment corresponding to the segment in the conversation in which the speech including a subject of the conversation identified by the conversation ID is uttered. Specifically, the determination unit 13 determines, based at least on the result of the speech recognition processing by the first speech recognition unit 11, the subject segment corresponding to the segment in which the speech including the subject of the conversation is uttered.

The determination unit 13 causes the storage unit 16 to store subject segment information which is information on the subject segment of the conversation in association with the conversation ID of the conversation. The subject segment information is also information on, e.g., a combination of respective times indicating a beginning end and a terminal end of the subject segment measured from the beginning of the conversation. Alternatively, the subject segment information may also be replaced with time segment information in the conversation. In other words, the subject segment information may also be information indicating what position the speech including the subject in the recognition result text thereof occupies in a series of the speeches uttered in the conversation. In this case, it may also be possible to additionally retrieve, from the processing result from the first speech recognition unit 11, segmental information of a segment in which the recognition result text including the subject of the conversation was generated.

The determination unit 13 can determine the subject segment based on, e.g., whether or not a preset keyword corresponding to a subject to be extracted or a synonym thereof is included in the recognition result text of each of the uttered speeches. Alternatively, the determination unit 13 may also determine the subject segment based on a structure of the conversation made by the plurality of speakers (the customer and the operator). Specifically, the determination unit 13 detects, from among the speeches uttered in the conversation, a subject confirmation speech uttered to confirm the subject. In the case of the conversation between the customer and the operator, the subject confirmation speech for confirming details (subject) of an inquiry from the customer is the speech uttered by the operator. The determination unit 13 may also determine that a speech uttered by another speaker (customer) other than the subject confirmation speech uttered by the operator and immediately previous to at least the subject confirmation speech is a subject speech.

In general, the operator mostly answers an inquiry from the customer after confirming details of the inquiry from the customer. Consequently, the subject confirmation speech uttered by the operator tends to frequently contain specified wording (such as "~ desu-ne." or "~ mase-ne.") for confirming the details of the inquiry. In addition, in order to confirm the details of the inquiry from the, customer, the operator mostly answers the inquiry from the customer after repeating the details of the inquiry from the customer. Consequently, the subject confirmation speech uttered by the operator tends to frequently contain wording common to the subject speech uttered by the customer.

On the basis of these tendencies, the determination unit 13 determines whether or not the speech uttered by the operator is the subject confirmation speech. The determination unit 13 may also determine whether or not the speech uttered by the operator is the subject confirmation speech by machine learning using various techniques such as deep learning and a support vector machine. Note that the subject confirmation speech has basically formulaic speech compared with the those of the subject speech. Accordingly, the determination of the subject confirmation speech is relatively easy.

On the basis of a result of the determination of the subject confirmation speech, the determination unit 13 determines whether the speech uttered by the customer is the subject speech. Specifically, the determination unit 13 determines that the speech uttered by the speaker (customer) different from the speaker (operator) of the subject confirmation speech and immediately previous to the subject confirmation speech is the subject speech.

When completing the determination of the subject segment of the conversation, the determination unit 13 notifies the processing management unit 12 of the completion of the determination of the subject segment. Normally, the determination unit 13 performs the determination of the subject segment for the entire conversation. However, the determination unit 13 may also end the processing at the time at which the determination unit 13 detects the subject segment including a preset subject.

The second speech recognition unit 14 uses a speech recognition method (second method) higher in accuracy than the speech recognition method (first method) used by the first speech recognition unit 11 to perform the speech recognition processing on the speech data in the segment determined to be the subject segment by the determination unit 13, and outputs a speech recognition result as a subject text indicating details of the speech uttered in the subject segment.

Specifically, the second speech recognition unit 14 acquires the subject segment information stored in as with the conversation ID reported from the processing management unit 12 in the storage unit 16. In addition, the second speech recognition unit 14 acquires, from the storage unit 15, the speech data in the subject segment shown in the acquired subject segment information, performs the speech recognition processing on the acquired speech data, and generates the subject text indicating the details of the speech uttered in the subject segment. The second speech recognition unit 14 causes the storage unit 17 to store the generated subject text in association with the conversation ID reported from the processing management unit 12. When completing the speech recognition processing of the speech uttered in the subject segment shown in the subject segment information, the second speech recognition unit 14 notifies the processing management unit 12 of the completion of the speech recognition processing of the speech uttered in the subject segment in the conversation identified by the reported conversation ID.

As described above, the speech recognition method used by the second speech recognition unit 14 is higher in accuracy than the speech recognition method used by the first speech recognition unit 11. For example, the second speech recognition unit 14 performs the speech recognition processing by using a speech recognition model that allows calculation of an acoustic score resistant to noise other than the speech uttered by the customer, which is mixed in a speech transmitter and hard to control unlike on an operator side, or resistant to electric noise superimposed on the speech when passing through a phone line. As an example of such a speech recognition model, a speech recognition model using the CNN-NIN method for the calculation of the acoustic score can be used. Details of the calculation of the acoustic score using the CNN-NIN method is described in, e.g., Reference Literature 1 shown below, and therefore a description thereof is omitted.

[Reference Literature 1]

"THE NTT CHIME-3 SYSTEM: ADVANCES IN "SPEECH ENHANCEMENT AND RECOGNITION FOR MOBILE MULTI-MICROPHONE DEVICES", Takuya Yoshioka, Nobutaka Ito, Marc Delcroix, Atsunori Ogawa, Keisuke Kinoshita, Masakiyo Fujimoto, Chengzhu Yu, Wojciech J. Fabian, Miguel Espi, Takuya Higuchi, Shoko Araki, and Tomohiro Nakatani, in Proceedings of the IEEE Workshop on Automatic Speech Recognition and Understanding (MRU), pp. 436-443, December 2015.

It is possible to not only achieve an improvement in robustness by using the calculation method for the acoustic score, but also achieve an improvement in speech data recognition performance on a customer side by improving a calculation method for a language score. Conventionally, in calculation of the language score, consideration has been given only to word concatenation between about several words. By using a language score calculation method in which the number of concatenated words to be considered is not limited herein, it is possible to provide higher recognition performance. Calculation of a language score as described above can be implemented by using a language model using, e.g., RNN (Recurrent Neural Network) (see Reference Literature 2 shown below).

[Reference Literature 2]

"Deep Learning for Speech Recognition", Yotaro Kubo, Journal of the Japanese Society for Artificial Intelligence, Vol. 29, No. 1, pp. 62-70, January 2014.

The second speech recognition unit 14 may also perform speech recognition by combining, e.g., the calculation of the acoustic score using the speech recognition model using the CNN-NIN method described above and the calculation of the language score using the language model using the RNN.

The determination unit 13 may also determine/output not only the subject but also a domain of the uttered speech or the subject based on a keyword included in the uttered speech or the subject segment, a synonym thereof, or the like, while the second speech recognition unit 14 may also use a speech recognition model corresponding to the domain output from the determination unit 13. Alternatively, the second speech recognition unit 14 may also use a speech recognition model having improvable speech recognition accuracy by using acoustic features of a speech other than the speech uttered by the customer, background sound/noise, or the like in the speech data of the speech uttered by the customer, a degree of reliability of the first speech recognition unit 11, or the like.

In other words, the second speech recognition unit 14 may also use, as the speech recognition method (second method), a speech recognition method using the speech recognition model in accordance with the domain of the subject determined by the determination unit 13. Alternatively, the second speech recognition unit 14 may also use a speech recognition method using the speech recognition model in accordance with the acoustic features of the uttered speech or to a degree of reliability of the speech recognition by the first speech recognition unit 11.

The subject of a conversation is extremely important in analyzing the conversation. In the present embodiment, the second speech recognition unit 14 performs the highly accurate speech recognition processing on the speech uttered in the segment determined to be the subject segment by the determination unit 13. Consequently, it is possible to acquire a highly accurate speech recognition result for the subject of the conversation. In general, a speech recognition method higher in accuracy tends to involve a larger amount of calculation. In the present embodiment, the second speech recognition unit 14 performs the speech recognition processing only for the segment determined to the subject segment. Accordingly, as compared to a case where highly accurate speech recognition is performed for the entire conversation, it is possible to inhibit an increase in the amount of calculation. As a result, it is possible to reduce calculation resources such as a CPU (Central Processing Unit) and a memory.

Next, a description will be given of the retrieval device 20.

To the retrieval device 20, a text such as a sentence or a phrase is input as the retrieval query. The retrieval device 20 retrieves, on the basis of the retrieval query, the retrieval index in which the subject text obtained by the speech recognition processing performed on the speech uttered in the subject segment by the second speech recognition unit 14 and stored in the storage unit 17 is associated with the conversation ID of the conversation including the uttered speech. Then, the retrieval device 20 outputs the conversation ID associated with the subject text including the retrieval query (a partial match or an exact match) or similar to the retrieval query. For example, the retrieval device 20 calculates, using words included in a text of the retrieval query and words included in the subject text, a degree of similarity of a meaning based on a meaning vector set in advance for each of the words. Then, the retrieval device 20 extracts, e.g., the subject text having a degree of similarity of not less than a predetermined value to the text of the retrieval query as the subject text similar to the retrieval query. For example, a word concept vector in a word concept base which is a set of pairs of words and the word concept vectors representing concepts of the words can be used as the meaning vector of each of the words. By combining and calculating the word concept vectors of the individual words included in the subject text, the meaning vector of the subject text is calculated. By combining and calculating the word concept vectors of the individual words included in the retrieval query, the meaning vector of the retrieval query is calculated. The degree of similarity of the meaning can be calculated as, e.g., a degree of cosine similarity between the two meaning vectors. Details of the calculation of the meaning vector and the calculation of the degree of similarity of the meaning are described in, e.g., Reference Literature 3 shown below, and therefore a description thereof is omitted.

[Reference Literature 3]

Japanese Patent Application Publication No. 2017-072884

An object to be retrieved by the retrieval device 20 is limited to the subject text obtained, for the speech determined to be uttered in the subject segment, by the highly accurate speech recognition processing performed by the second speech recognition unit 14. Consequently, it is possible to specify the speech uttered for the subject having a high degree of conformity to the retrieval query. A user of the retrieval device 20 to which the retrieval query is input reads, on the basis of the conversation ID output from the retrieval device 20, the speech data of the conversation identified by the conversation ID, the result of the speech recognition performed by the first speech recognition unit 11 for the conversation, or the like stored in the storage unit 15. As a result, the user can perform analysis of the conversation related to the subject of the customer corresponding to the retrieval query or the like.

Next, a description will be given of operations of the speech recognition device 10 and the retrieval device 20.

Figure 2:
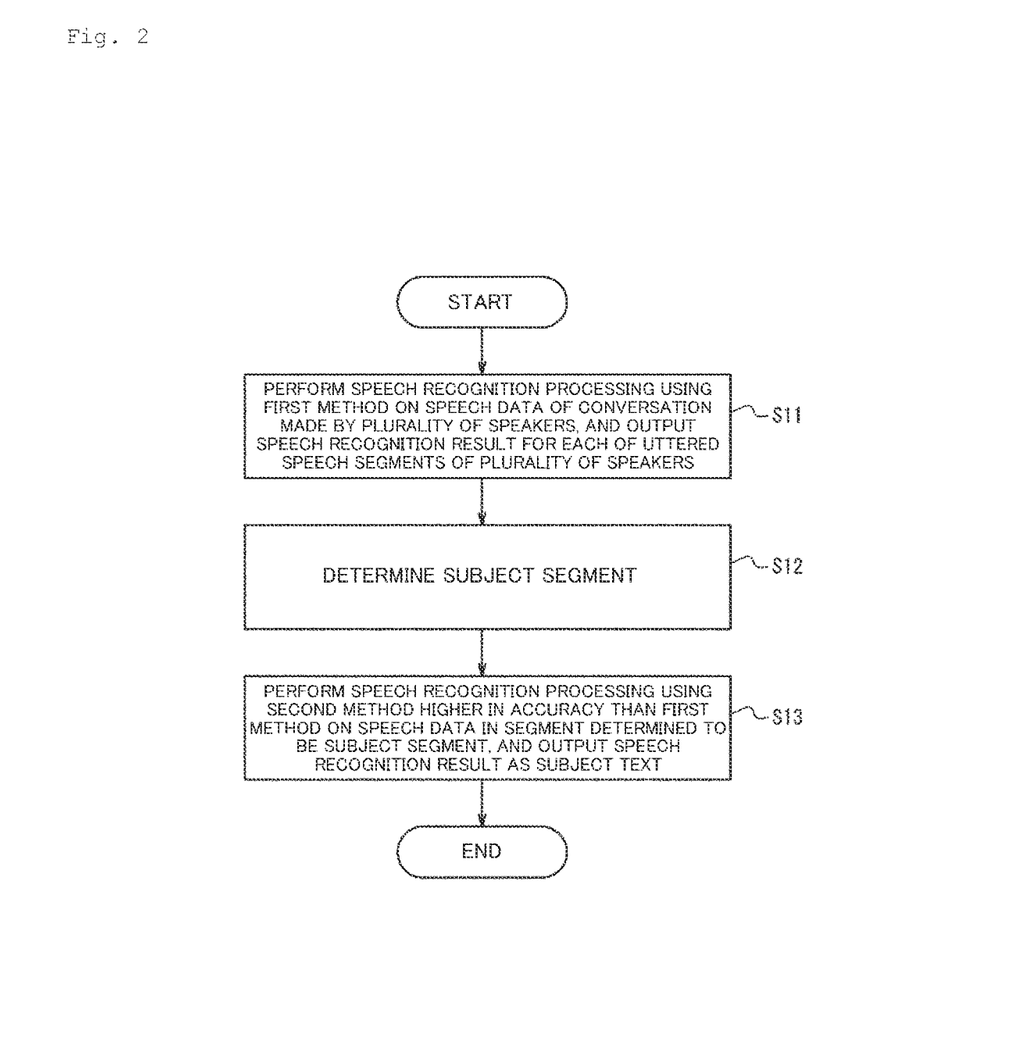
FIG. 2 is a flow chart illustrating an example of an operation of the speech recognition device illustrated in FIG. 1.

FIG. 2 is a flow chart illustrating an example of the operation of the speech recognition device 10 according to the present embodiment, which is a diagram for illustrating a speech recognition method to be implemented in the speech recognition device 10.

The first speech recognition unit 11 performs the speech recognition using the first method subsequently described on the input speech data of the conversation made by the plurality of speakers, and outputs the speech recognition result for each of the uttered speech segments of the plurality of speakers (Step S11). The first method used herein is, e.g., the speech recognition method using the HMM method, the HMM-DNN method, or the like.

The determination unit 13 determines, on the basis of the result of the speech recognition processing using the first method, the subject segment which is the segment in which the speech including the subject of the conversation is uttered (Step S12).

The second speech recognition unit 14 performs the speech recognition processing using the second method higher in accuracy then the first method on the speech data in the segment determined to the subject segment, and outputs the speech recognition result as the subject text (Step S13). The second method used herein is, e.g., the speech recognition method using the CNN-NIN method or the like.

Figure 3:
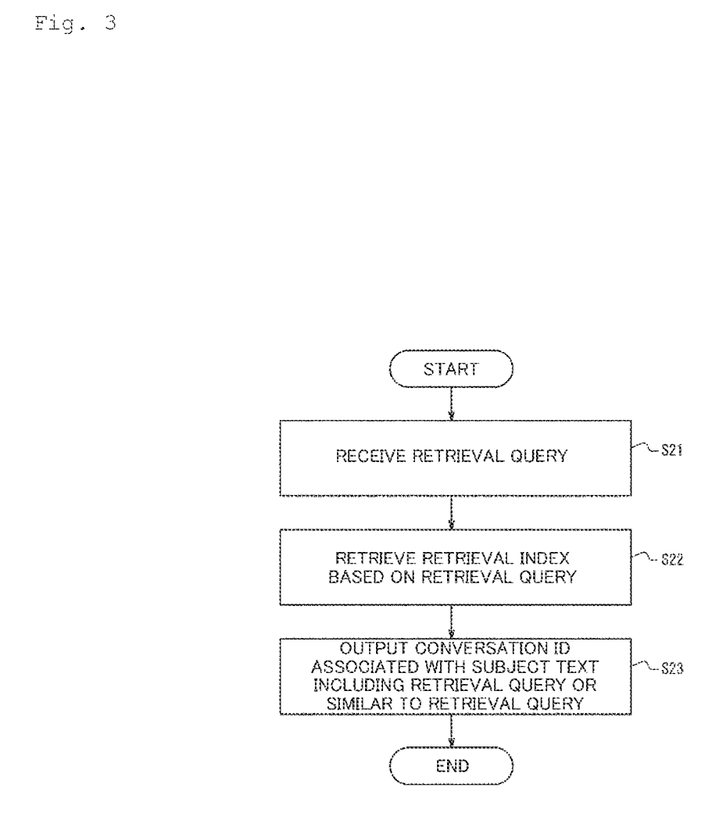
FIG. 3 is a flow chart illustrating an example of an operation of a retrieval device illustrated in FIG. 1.

FIG. 3 is a flow chart illustrating an example of the operation of the retrieval device 20, which is a diagram for illustrating the retrieval method implemented in the retrieval device 20.

The retrieval device 20 receives the retrieval query such as the phrase or the sentence input thereto (Step S21).

Then, the retrieval device 20 retrieves, on the basis of the retrieval query, the retrieval index in which the subject text obtained by the speech recognition processing performed using the second method on the speech uttered in the subject segment is associated with the conversation ID (identifier) of the conversation including the uttered speech (Step S22).

Then, the retrieval device 20 outputs the conversation ID associated with the subject text including the retrieval query or similar to the retrieval query (Step S23).

Next, referring to the flow charts illustrated in FIGS. 4 to 9, a description will be given of the operation of the processing management unit 12. Note that, when the speech recognition device 10 according to the present embodiment is applied to a contact center in which a plurality of conversations are performed in parallel or the like, a plurality of the first speech recognition units 11 are provided, and the speech recognition processing steps the number of which corresponds to the number of the conversations made in parallel are also performed in parallel by the first speech recognition units 11. In addition, a plurality of the determination units 13 and a plurality of the second speech recognition units 14 are also provided, and the processing steps are performed in parallel. The processing management unit 12 performs allocation of the determination processing steps for the subject segments of the conversations to the plurality of determination units 13 and allocation of the speech recognition processing steps for the speeches uttered in the subject segments to the plurality of second speech recognition units 14.

Figure 4:
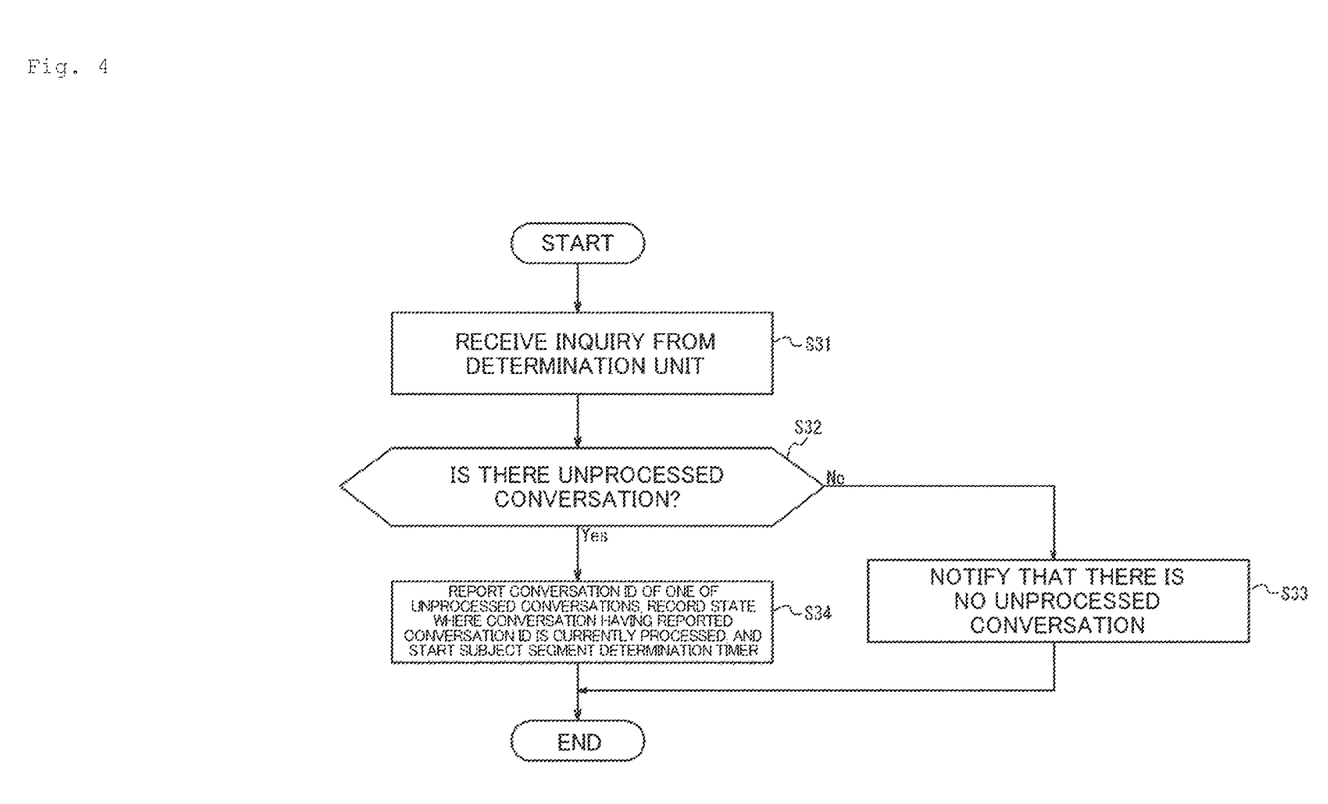
FIG. 4 is a flow chart illustrating an example of an operation performed by a processing management unit illustrated in FIG. 1 when receiving an inquiry from a determination unit.

FIG. 4 is a flow chart illustrating an example of an operation performed by the processing management unit 12 when receiving an inquiry from the determination unit 13.

In a case where there is no conversation to be processed, the determination unit 13 inquires the processing management unit 12 of the presence or absence of the conversation unprocessed with respect to the determination of the subject segments. Examples of the case where there is no conversation to be processed mentioned herein include a case where the determination of the subject segment for the allocated conversation is completed. When receiving the inquiry from the determination unit 13 (Step S31), the processing management unit 12 refers to the storage unit 15 to determine the presence or absence of the conversation unprocessed with respect to the determination of the subject segment (Step S32).

When determining that there is no conversation unprocessed with respect to the determination of the subject segment (No in Step S32), the processing management unit 12 notifies the determination unit 13 that there is no conversation unprocessed with respect to the determination of the subject segment (Step S33), and ends the processing.

When determining that there are conversations unprocessed with respect to the determination of the subject segments (Yes in Step S32), the processing management unit 12 reports, to the determination unit 13, the conversation ID of one of the conversations unprocessed with respect to the determination of the subject segments. The processing management unit 12 also records, in the storage unit 15, a state where the conversation having the reported conversation ID is currently processed. This can prevent the determination of the subject segment of the conversation identified by one conversation ID from being allocated to the plurality of determination units 13. The processing management unit 12 also starts a subject segment determination timer for determining whether or not a predetermined time period has elapsed since the determination of the subject segment of the conversation was allocated to the determination unit 13 (Step S34).

Figure 5:
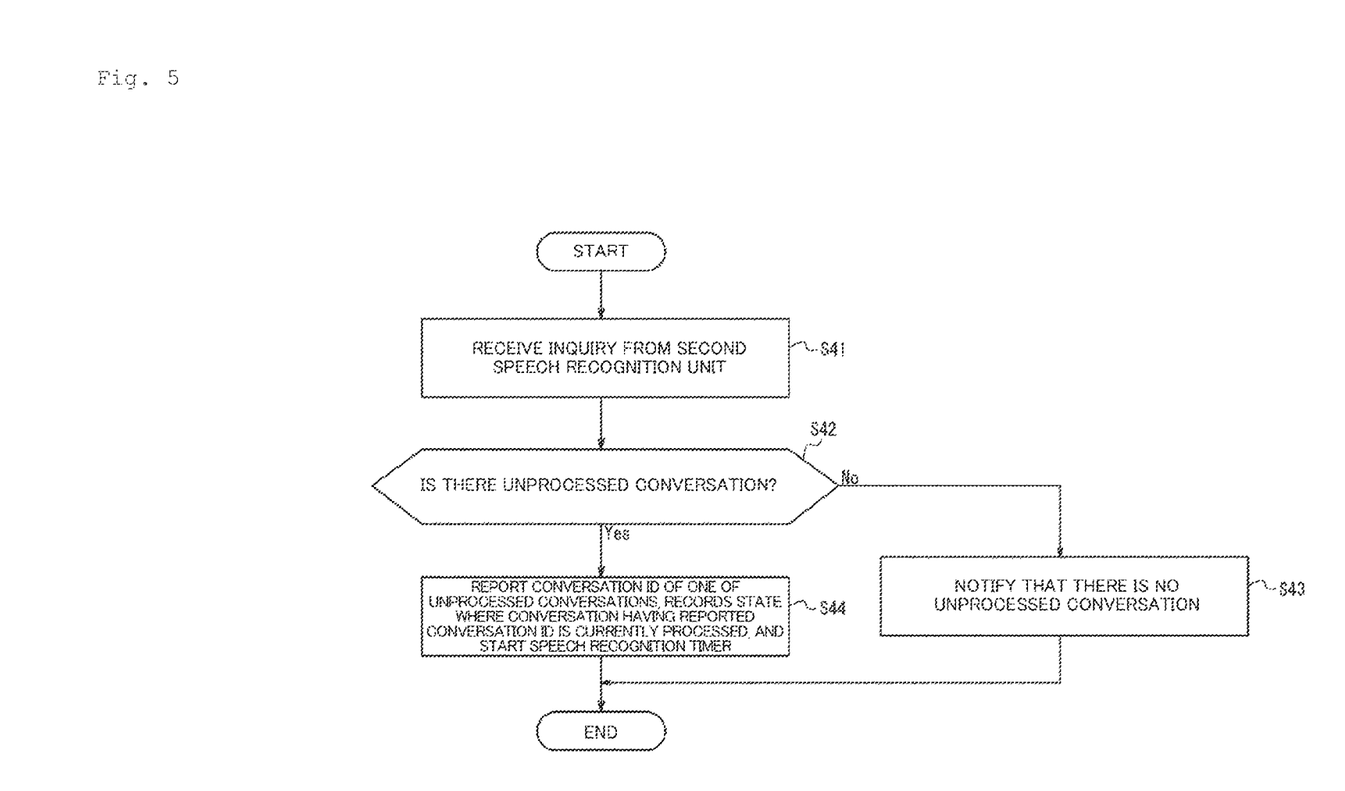
FIG. 5 is a flow chart illustrating an example of an operation performed by the processing management unit illustrated in FIG. 1 when receiving an inquiry from a second speech recognition unit.

FIG. 5 is a flow chart illustrating an example of an operation performed by the processing management unit 12 when receiving an inquiry from the second speech recognition unit 14.

In a case where there is no conversation to be processed, the second speech recognition unit 14 inquires the processing management unit 12 of the presence or absence of a conversation unprocessed with respect to the speech recognition of the speech uttered in the subject segment. Examples of the case where there is no conversation to be processed include a case where the speech recognition processing of the speech uttered in the subject segment is completed for the allocated conversation. When receiving the inquiry from the second speech recognition unit 14 (Step S41), the processing management unit 12 refers to the storage unit 15 to determine the presence or absence of the conversation unprocessed with respect to the speech recognition of the speech uttered in the subject segment (Step S42).

When determining that there is no conversation unprocessed with respect to the speech recognition of the speech uttered in the subject segment (No in Step S42), the processing management unit 12 notifies the second speech recognition unit 14 that there is no conversation unprocessed with respect to the speech recognition of the speech uttered in the subject segment (Step S43), and ends the processing.

When determining that there are conversations unprocessed with respect to the speech recognition of the speech uttered in the subject segment (Yes in Step S42), the processing management unit 12 reports, to the second speech recognition unit 14, the conversation ID of one of the conversations unprocessed with respect to the speech recognition of the speech uttered in the subject segment. The processing management unit 12 also records, in the storage unit 15, a state where the conversation having the reported conversation ID is currently processed. This can prevent the speech recognition processing for the subject segment of the conversation identified by one conversation ID from being allocated to the plurality of second speech recognition units 14. The processing management unit 12 also starts a speech recognition timer for determining whether or not a predetermined time period has elapsed since the speech recognition processing of the speech uttered in the subject segment was allocated to the determination unit 13 (Step S44).

Figure 6:
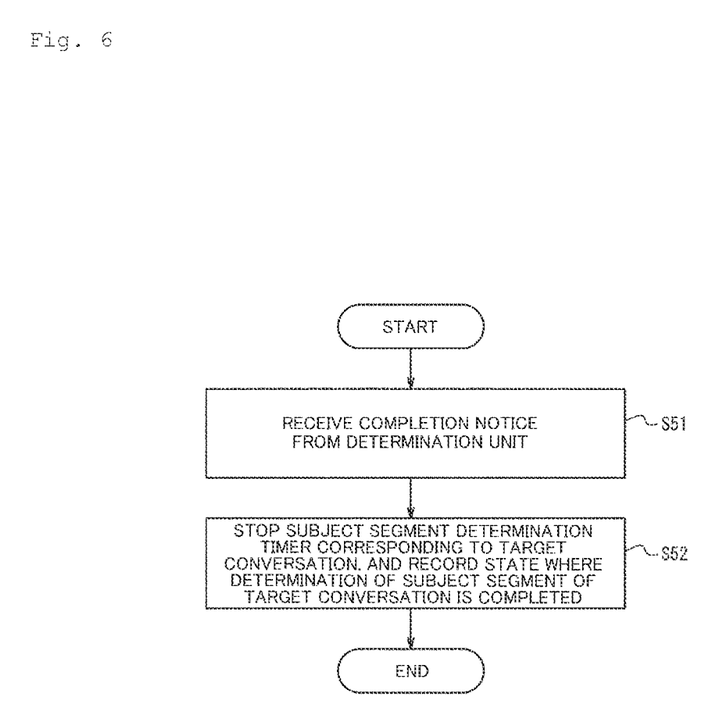
FIG. 6 is a flow chart illustrating an example of an operation performed by the processing management unit illustrated in FIG. 1 when receiving a completion notice from the determination unit.

FIG. 6 is a flow chart illustrating an example of an operation performed by the processing management unit 12 when receiving a completion notice from the determination unit 13.

When completing the determination of the subject segment of the conversation (target conversation) identified by the conversation ID reported from the processing management unit 12, the determination unit 13 gives, to the processing management unit 12, a completion notice indicating the completion of the determination of the subject segment of the target conversation. When receiving the completion notice from the determination unit 13 (Step S51), the processing management unit 12 stops the subject determination timer corresponding to the target conversation. The processing management unit 12 also stores, in the storage unit 15, the completion of the determination of the subject segment of the target conversation (Step S52).

Figure 7:
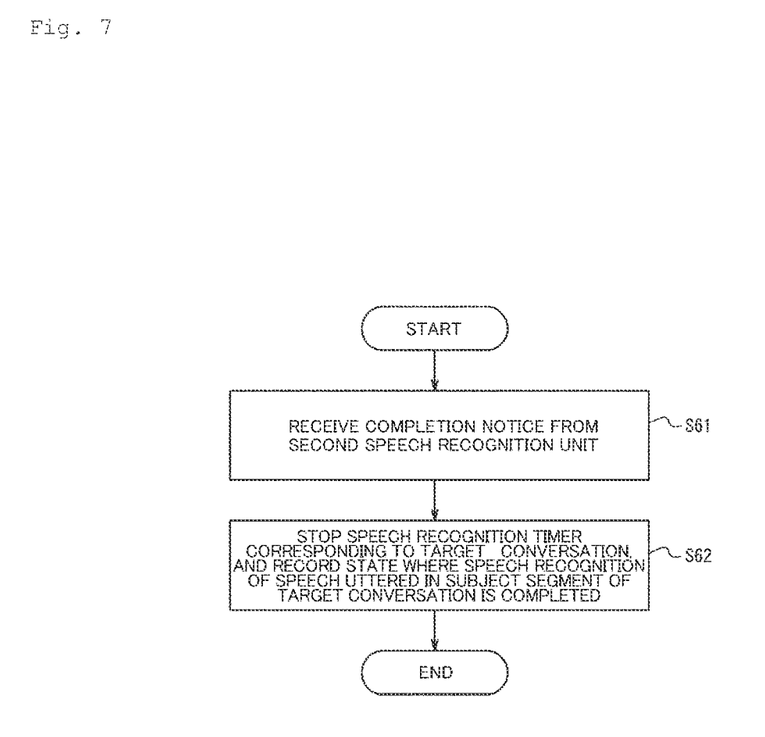
FIG. 7 is a flow chart illustrating an example of an operation performed by the processing management unit illustrated in FIG. 1 when receiving a completion notice from the second speech recognition unit.

FIG. 7 is a flow chart illustrating an example of an operation performed by the processing management unit 12 when receiving a completion notice from the second speech recognition unit 14.

When completing the speech recognition processing of the speech uttered in the subject segment of the conversation (target conversation) identified by the conversation ID reported from the processing management unit 12, the second speech recognition unit 14 gives, to the processing management unit 12, a completion notice indicating the completion of the speech recognition processing of the speech uttered in the subject segment of the target conversation. When receiving the completion notice from the second speech recognition unit 14 (Step S61), the processing management unit 12 stops the speech recognition timer corresponding to the target conversation. The processing management unit 12 also records, in the storage unit 15, the completion of the speech recognition processing of the speech uttered in the subject segment of the target conversation (Step S62).

Figure 8:
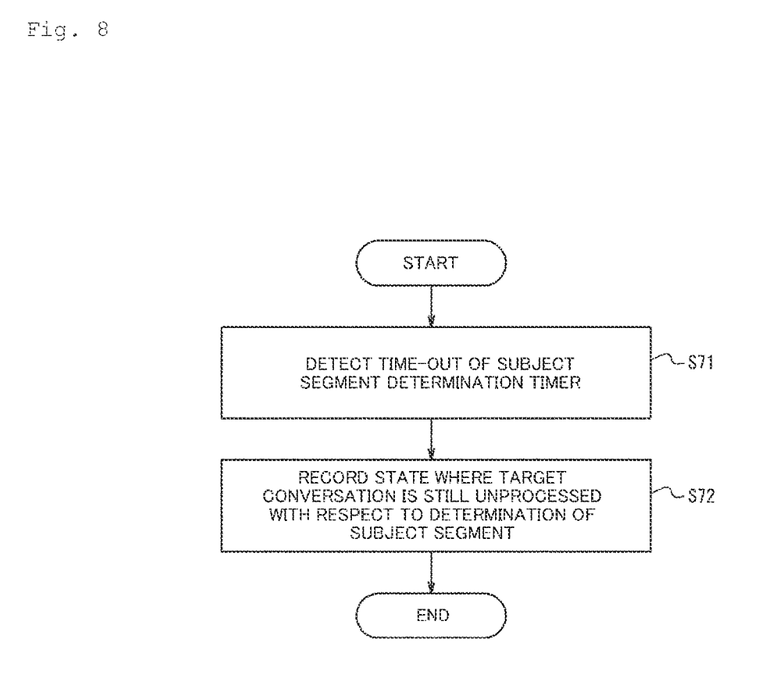
FIG. 8 is a flow chart illustrating an example of an operation performed by the processing management unit illustrated in FIG. 1 when detecting a time-out of a subject segment determination timer.

FIG. 8 is a flow chart illustrating an example of an operation performed by the processing management unit 12 when detecting a time-out of a subject segment determination timer.

When detecting the time-out of the subject segment determination timer (Step S71), the processing management unit 12 records, in the storage unit 15, a state where the target conversation corresponding to the target segment determination timer of which the time-out is detected is still unprocessed with respect to the determination of the subject segment (Step S72).

When the time-out of the subject segment determination timer is detected, i.e., when the determination unit 13 does not give the completion notice within a predetermined time period after the conversation ID of the target conversation for which the subject segment is to be determined was given to the determination unit 13, it is considered that, due to occurrence of any problem in the processing, the determination of the subject segment failed in the determination unit 13. In this case, by recording the state where the target conversation is still unprocessed with respect to the determination of the subject segment, it is possible to cause the determination unit 13 to determine the subject segment of the target conversation again.

Figure 9:
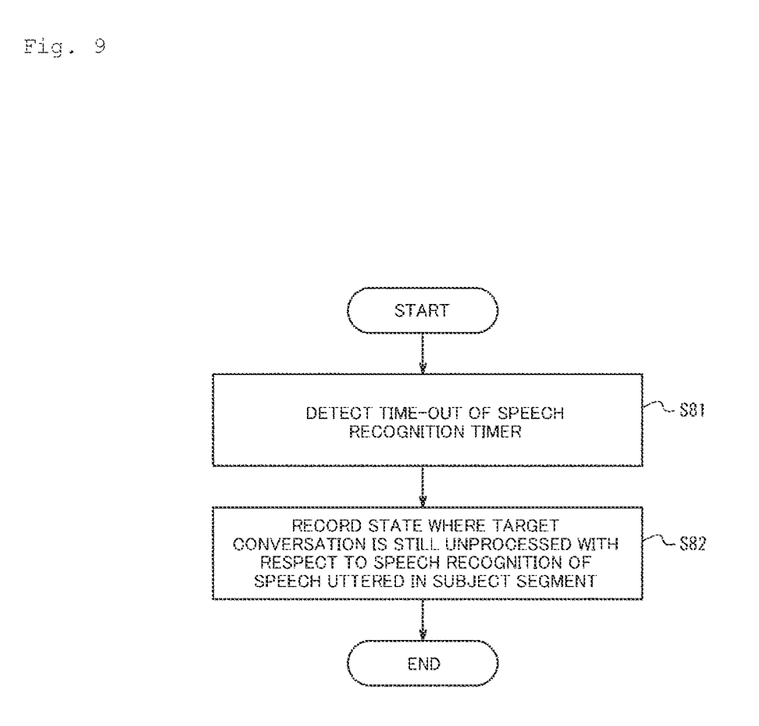
FIG. 9 is a flow chart illustrating an example of an operation performed by the processing management unit illustrated in FIG. 1 when detecting a time-out of a speech recognition timer.

FIG. 9 is a flow chart illustrating an example of an operation performed by the processing management unit 12 when detecting a time-out of a speech recognition timer.

When detecting the time-out of the speech recognition timer (Step S81), the processing management unit 12 records, in the storage unit 15, a state where the target conversation corresponding to the speech recognition timer of which the time-out is detected is still unprocessed with respect to the speech recognition of the speech uttered in the subject segment (Step S82).

When the time-out of the speech recognition timer is detected, i.e., when the second speech recognition unit 14 does not give the completion notice within a predetermined time period after the conversation ID of the target conversation for which the speech recognition for the subject segment is to be performed was reported to the second speech recognition unit 14, it is considered that, due to occurrence of any problem in the processing, the speech recognition of the speech uttered in the subject segment failed in the second speech recognition unit 14. In this case, by recording the state where the target conversation is still unprocessed with respect to the speech recognition of the speech uttered in the subject segment, it is possible to cause the second speech recognition unit 14 to perform the speech recognition of the speech uttered in the subject segment of the target conversation again.

As described with reference to FIGS. 4 to 9, the processing management unit 12 performs the allocation of the processing steps of determining the subject segments to the plurality of determination units 13 and the allocation of the processing steps of performing the speech recognition of the speeches uttered in the subject segments to the plurality of second speech recognition units 14. Respective processing step periods of the processing steps by the determination units 13 and the processing steps by the second speech recognition units 14 are not equal, and differ depending on the conversations to be processed or types of the speeches. Accordingly, when a large number of conversation speeches are to be processed, the processing management unit 12 performs the allocation to allow, as soon as each of the processing steps is ended, the processing step for another conversation to be performed. As a result, the processing steps can be performed more efficiently than when the determination unit 13 and the second speech recognition unit 14 are originally allocated to one conversation to process the conversation. Therefore, it is possible to reduce the respective numbers of the determination units 13 and the second speech recognition units 14.

Thus, in the present embodiment, the speech recognition device 10 includes the first speech recognition unit 11, the determination unit 13, and the second speech recognition unit 14. The first speech recognition unit 11 performs the speech recognition processing using the first method on the speech data of the conversation made by the plurality of speakers, and outputs the speech recognition result for each of the uttered speech segments of the plurality of speakers. The determination unit 13 determines, on the basis of the results of the speech recognition processing performed by the first speech recognition unit 11, the subject segment corresponding to the segment in which the speech including the subject of the conversation is uttered. The second speech recognition unit 14 performs the speech recognition processing using the second method higher in accuracy than the first method on the speech data in the segment determined to be the subject segment by the determination unit 13, and outputs the speech recognition result as the subject text.

Since the second speech recognition unit 14 performs the speech recognition processing using the second method higher in accuracy than the first method on the speech uttered in the segment determined to be the subject segment, it is possible to acquire the highly accurate speech recognition result for the subject of the conversation. In addition, since the second speech recognition unit 14 performs the speech recognition processing only for the segment determined to be the subject segment, it is possible to inhibit an increase in the amount of calculation as compared to a case where highly accurate speech recognition processing is performed for the entire conversation.

While the description has been given heretofore of the speech recognition device 10 and the retrieval device 20, it is also possible to use a computer and cause the computer to function as the speech recognition device 10 and the retrieval device 20. Such a computer can be implemented by storing, in a storage unit of the computer, a program describing details of processing for implementing the respective functions of the speech recognition device 10 and the retrieval device 20 and causing a CPU of the computer to read this program and execute the program.

The program may also be recorded on a computer readable recording medium. By using such a recording medium, it is possible to install the program in the computer. The recording medium on which the program is recorded may also be a non-transitory recording medium. The non-transitory recording medium is not particularly limited, and may also be a recording medium such as, e.g., a CD-ROM or a DVD-ROM.

While the embodiment has been described above as a representative example, it is obvious to a person skilled in the art that numerous changes and substitutions can be made within the intent and scope of the present invention. Therefore, the embodiment described above should not be construed to limit the present invention, and the present invention can variously be modified and changed without departing from the scope of the claims. For example, it is possible to combine a plurality of constituent blocks illustrated in the configuration diagrams of the embodiment into one constituent block or divide one constituent block into a plurality of constituent blocks.

REFERENCE SIGNS LIST

10 Speech recognition device
11 First speech recognition unit
12 Processing management unit
13 Determination unit
14 Second speech recognition unit
15, 16, and 17 Storage units

The invention claimed is:

1. A speech recognition device a processor configured to execute operations comprising:
   performing first speech recognition processing using a first method on speech data of a conversation made by a plurality of speakers and outputs a speech recognition result for each of respective uttered speech segments of the plurality of speakers;
   determining, on the basis of a result of the first speech recognition processing, a subject segment of the conversation, wherein the subject segment represents a segment of the speech data including a part of the conversation with utterances about a subject; and
   performing second speech recognition processing using a second method higher in accuracy than the first method on speech data in the segment determined to be the subject segment by the determiner and outputs a speech recognition result as a subject text.

2. The speech recognition device according to claim 1, wherein the determining further comprises determining a domain of the subject based on a keyword included in the uttered speech or the subject segment and a synonym of the keyword, and the second speech recognition processing uses, as the second method, a speech recognition method that uses a speech recognition model in accordance with the domain of the subject of the determined subject segment or a speech recognition method using a speech recognition model in accordance with an acoustic feature of the uttered speech or with a degree of reliability of the first speech recognition processing.

3. A retrieval device comprising a processor configured to execute operations comprising:
retrieving, on the basis of the retrieval query, a retrieval index in which the subject text output from the second speech recognition processing according to claim 1 is associated with an identifier of the conversation including the uttered speech and outputting the identifier associated with the subject text including the retrieval query or similar to the query.

4. The speech recognition device according to claim 1, wherein the determining further comprises determining the subject segment based on a structure of a conversation by a plurality of speakers, and wherein the structure of a conversation includes a subject confirmation speech uttered to confirm the subject of the conversation.

5. A speech recognition method, comprising:
performing speech recognition processing using a first method on speech data of a conversation made by a plurality of speakers and outputting a speech recognition result for each of respective uttered speech segments of the plurality of speakers;
determining, on the basis of a result of the speech recognition processing using the first method, a subject segment of the conversation, wherein the subject segment represents, wherein the subject segment represents a segment of the speech data including a part of the conversation with utterances about a subject; and
performing, speech recognition processing using a second method higher in accuracy than the first method on the speech data in the segment determined to be the subject segment and outputting a speech recognition result as a subject text.

6. The speech recognition method according to claim 5, wherein the first method includes a speech recognition method using a HMM (Hidden Markov Model) method or a HMM-DNN (Deep Neural Network) method, and the second method includes a speech recognition method using a CNN-NIN (Convolutional Neural Network and Network In Network) method.

7. The speech recognition method according to claim 5, wherein the determining further comprises determining the subject segment based on a structure of a conversation by a plurality of speakers, and wherein the structure of a conversation includes a subject confirmation speech uttered to confirm the subject of the conversation.

8. The speech recognition method according to claim 5, wherein the first method includes a speech recognition method using a HMM (Hidden Markov Model) method or a HMM-DNN (Deep Neural Network) method, and the second method includes a speech recognition method using a CNN-NIN (Convolutional Neural Network and Network In Network) method.

9. The speech recognition method according to claim 5, wherein the determining further comprises determining a domain of the subject based on a keyword included in the uttered speech or the subject segment and a synonym of the keyword, and
the second speech recognition processing uses, as the second method, a speech recognition method that uses a speech recognition model in accordance with the domain of the subject of the determined subject segment or a speech recognition method using a speech recognition model in accordance with an acoustic feature of the uttered speech or with a degree of reliability of the first speech recognition processing.

* * * * *